(12) United States Patent
Kook (10) Patent No.: US 7,070,117 B2
(45) Date of Patent: Jul. 4, 2006

(54) FEEDBACK APPARATUS FOR AIR-CONDITIONING ACTUATOR FOR VEHICLE

(75) Inventor: Dong Ho Kook, Anyang (KR)

(73) Assignee: Dong-Ah Electronics Components Co., Ltd., Guri (KR)

( * ) Notice: Subject to any disclaimer, the term of this patent is extended or adjusted under 35 U.S.C. 154(b) by 105 days.

(21) Appl. No.: 10/928,820

(22) Filed: Aug. 27, 2004

(65) Prior Publication Data

US 2006/0042281 A1 Mar. 2, 2006

(51) Int. Cl.
*G05D 15/00* (2006.01)
*G05D 23/12* (2006.01)
*G05B 1/06* (2006.01)
*F24F 11/33* (2006.01)

(52) U.S. Cl. .................. 236/74 R; 236/1 C; 318/15; 318/663; 318/666

(58) Field of Classification Search .............. 236/74 R, 236/1 C; 318/15, 663, 664, 665, 666
See application file for complete search history.

(56) References Cited

U.S. PATENT DOCUMENTS

| | | | |
|---|---|---|---|
| 4,311,946 A * | 1/1982 | Pathmann | 318/663 |
| 4,616,164 A * | 10/1986 | Kenny et al. | 318/666 |
| 4,857,812 A * | 8/1989 | Mochizuki et al. | 318/15 |
| 4,931,710 A * | 6/1990 | DeVara et al. | 318/663 |
| 5,363,713 A * | 11/1994 | Pearson | 74/425 |
| 6,028,384 A * | 2/2000 | Billman et al. | 310/83 |
| 6,853,160 B1 * | 2/2005 | Gandel et al. | 318/561 |
| 2005/0082378 A1 * | 4/2005 | Beishline et al. | 236/74 R |

* cited by examiner

*Primary Examiner*—Marc Norman
(74) *Attorney, Agent, or Firm*—F. Chau & Associates, LLC (57) ABSTRACT

A feedback apparatus for a vehicle air-conditioning actuator is provided. The feedback apparatus includes a cover plate including a thin plate resistor formed on the bottom thereof, a small case combined with the cover plate, including an assembly protruding portion formed in one side thereof, a plate-shaped rotation slider interposed between the cover plate and the small case, including a third axial hole and an opening whose size is about a quarter of the total size, a wiper whose contact front end is exposed in the opening of the rotation slider and rear end is fixed to the bottom of the rotation slider to rotatably contact a thin plate resistor formed on the bottom of the cover plate, a terminal assembly having connection pins for receiving external signals in which connection pins combined with the cover plate is formed. Since a contact between the wiper and the thin plate resistor is accomplished in a sealed case, there is little possibility of altering an initial set position due to an external shock. Thus, an operational stability of the actuator is enhanced.

4 Claims, 7 Drawing Sheets

FEEDBACK APPARATUS FOR AIR-CONDITIONING ACTUATOR FOR VEHICLE

BACKGROUND OF THE INVENTION

1. Field of the Invention

The present invention relates to a feedback apparatus for an air-conditioning actuator for a vehicle, and more particularly, to a feedback apparatus for an air-conditioning actuator for a vehicle in which both a rotation slider rotating together with a rotational angle of a door and a thin plate resistor are formed in a sealed flat structure, to thereby achieve a simplified structure, a convenient assembly work, and an enhanced operating stability.

2. Description of the Related Art

A system installed in a vehicle in order to agreeably maintain an indoor temperature, an indoor humidity, a cleanness and flow of air is called a vehicle air-conditioning system. The air-conditioning system largely includes three functions such as intake, mode and temperature functions.

First, the intake function makes external air taken in the inside of a vehicle, or internal air in the vehicle circulate.

Second, the mode function controls an air flow direction outgoing from a duct of the air-conditioning system to an exit of a vent, floor or defront.

Third, the temperature function controls an amount of mixture of cool air and warm air to make air of a driver's desired temperature taken into the inside of the vehicle.

These functions are performed by controlling an air-conditioning actuator for a vehicle to operate according to an electrical signal supplied from an electronic control unit in the vehicle and adjusting a degree of opening and closing a door installed in an exit of a duct.

Figure 1:
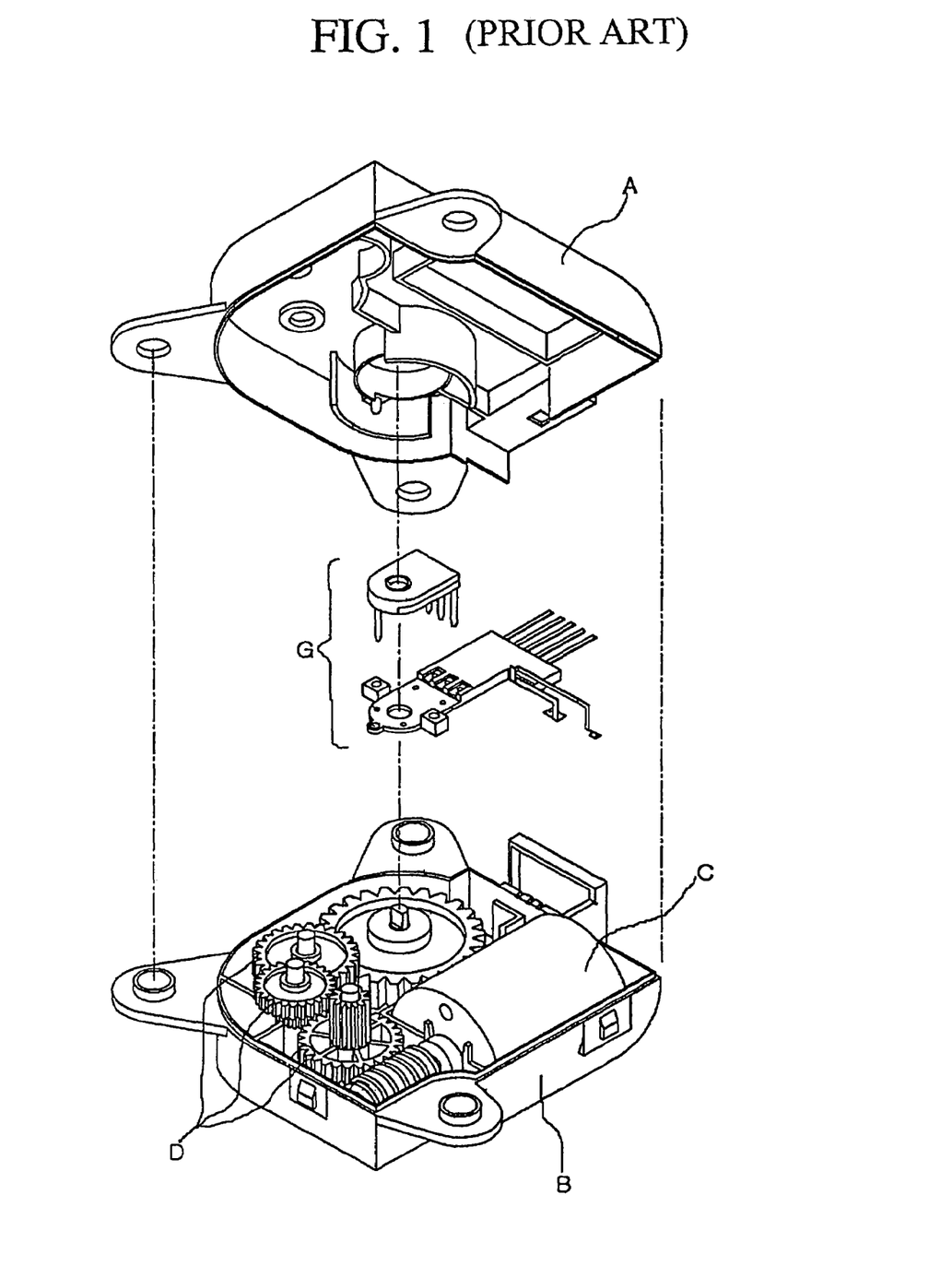
FIG. 1 is an exploded perspective view showing a feedback apparatus for a conventional vehicle air-conditioning actuator.
Figure 2:
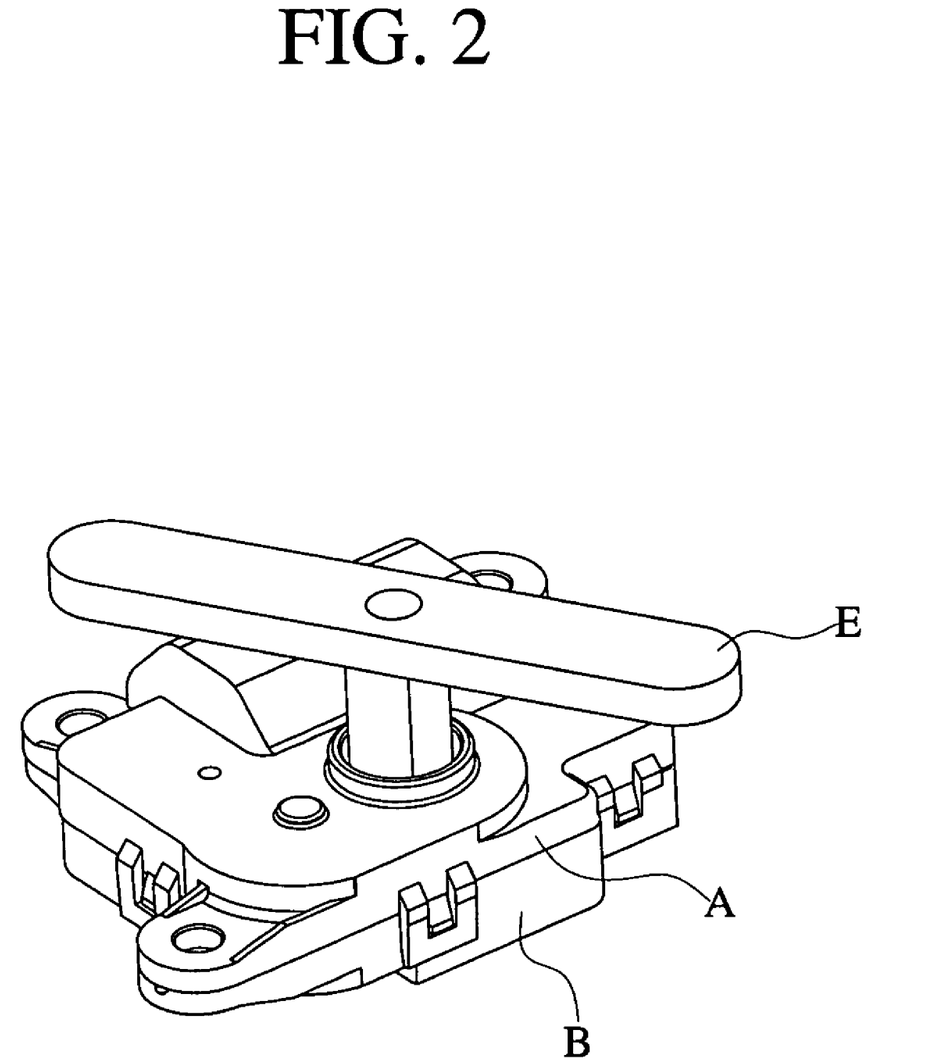
FIG. 2 is a perspective view showing a combined feedback apparatus for a vehicle air-conditioning actuator according to the present invention.

FIG. 1 is an exploded perspective view showing a feedback apparatus for a conventional vehicle air-conditioning actuator.

As shown in FIG. 1, the conventional vehicle air-conditioning actuator includes a pair of upper and lower cases A and B which are molded in a predetermined form in which various components are mounted, a motor C which is mounted in a house formed of the cases and positively or reversely rotates according to an electrical signal supplied from a controller, a group of gears D which includes a shaft gear and a set of reduction gears which are connected to each other to thereby obtain a predetermined output, a lever (not shown) whose one end is connected with the gear group and other end is connected to a door and makes the door move according to a torque transferred from the motor C, and a feedback apparatus G which is incorporated between the upper case A and the gear group D and fitted into the coupling axis of the upper portion of the gear in the output end.

The conventional feedback sensor assembly has the following problems.

First, since the conventional feedback sensor assembly uses a feedback sensor which rotates and contacts itself, an accurate signal detection is not performed. Although the conventional feedback sensor assembly does not use welding, the number of additional components including the feedback sensor increases. As a result, the conventional feedback sensor assembly has a complicated structure.

Second, an increase in the number of the assembled components needs more space. As a result, the size of the total case should be enlarged.

Third, if the size is enlarged when the number of the components is increased, the unit price increases, and the manpower cost for assembly increases.

SUMMARY OF THE INVENTION

To solve the above problems, it is an object of the present invention to provide a feedback apparatus for a vehicle air-conditioning actuator whose assembly structure is enhanced, using a conventional feedback sensor.

It is another object of the present invention to provide a feedback apparatus for a vehicle air-conditioning actuator which enhances an operating stability of an actuator, gives an accuracy of an initial set position, reduces a possibility of secession, simplifies the structure of the actuator, and conveniences an assembly, to thereby cause an advantageous unit price and greatly minimize the total size.

To accomplish the above object of the present invention, there is provided a feedback apparatus for a vehicle air-conditioning actuator, the feedback apparatus comprising: a cover plate including terminal connection holes, assembly holes respectively formed in a predetermined position, a first axial hole formed in the center thereof, and a thin plate resistor formed on the bottom thereof; a small case combined with the cover plate, including a second axial hole corresponding to the first axial hole, a main wall formed along the edge thereof, a predetermined space formed in the inside thereof, and an assembly protruding portion formed in one side thereof; a plate-shaped rotation slider interposed between the cover plate and the small case, including a third axial hole corresponding to the first and second axial holes, and an opening whose size is about a quarter of the total size; and a wiper whose contact front end is exposed in the opening of the rotation slider and rear end is fixed to the bottom of the rotation slider to rotatably contact the bottom of the cover plate.

It is preferable that the rotation slider in the feedback apparatus for a vehicle air-conditioning actuator includes protruding portions formed on the bottom thereof in which the wiper combined with the protruding portions includes assembly holes and after assembly the protruding portions are melted and combined with the assembly holes.

It is preferable that the third axial hole in the rotation slider in the feedback apparatus for a vehicle air-conditioning actuator includes a groove formed downwards from one side of the main wall in which axial walls each having a hook formed on the bottom thereof and openings are alternately formed and thus the axial walls and the openings are fitted on the lower slant surface of the axial hole in the case.

BRIEF DESCRIPTION OF THE DRAWINGS

The above and other objects and advantages of the present invention will become more apparent by describing the preferred embodiment thereof in detail with reference to the accompanying drawings in which:

FIG. 2 is an exploded perspective view showing a separated feedback apparatus for a vehicle air-conditioning actuator according to the present invention;

DETAILED DESCRIPTION OF THE INVENTION

A preferred embodiment of the present invention will be described with reference to the accompanying drawings.

As shown in the accompanying drawings, a vehicle air-conditioning actuator which is applied in the present invention includes an upper case A, a lower case B, a driving motor C, a group of gears D, a lever E, and a motor power source terminal F. Here, a feedback apparatus according to the present invention is combined with the a vehicle air-conditioning actuator.

The feedback apparatus 100 for a vehicle air-conditioning actuator includes a cover plate 110, a small case 120, a rotation slider 130, a wiper 140, and a terminal assembly 150.

The cover plate 110 includes terminal connection holes 112, assembly holes respectively formed in a predetermined position, a first axial hole 116 formed in the center thereof, and a thin plate resistor 118 formed on the bottom thereof.

Figure 5:
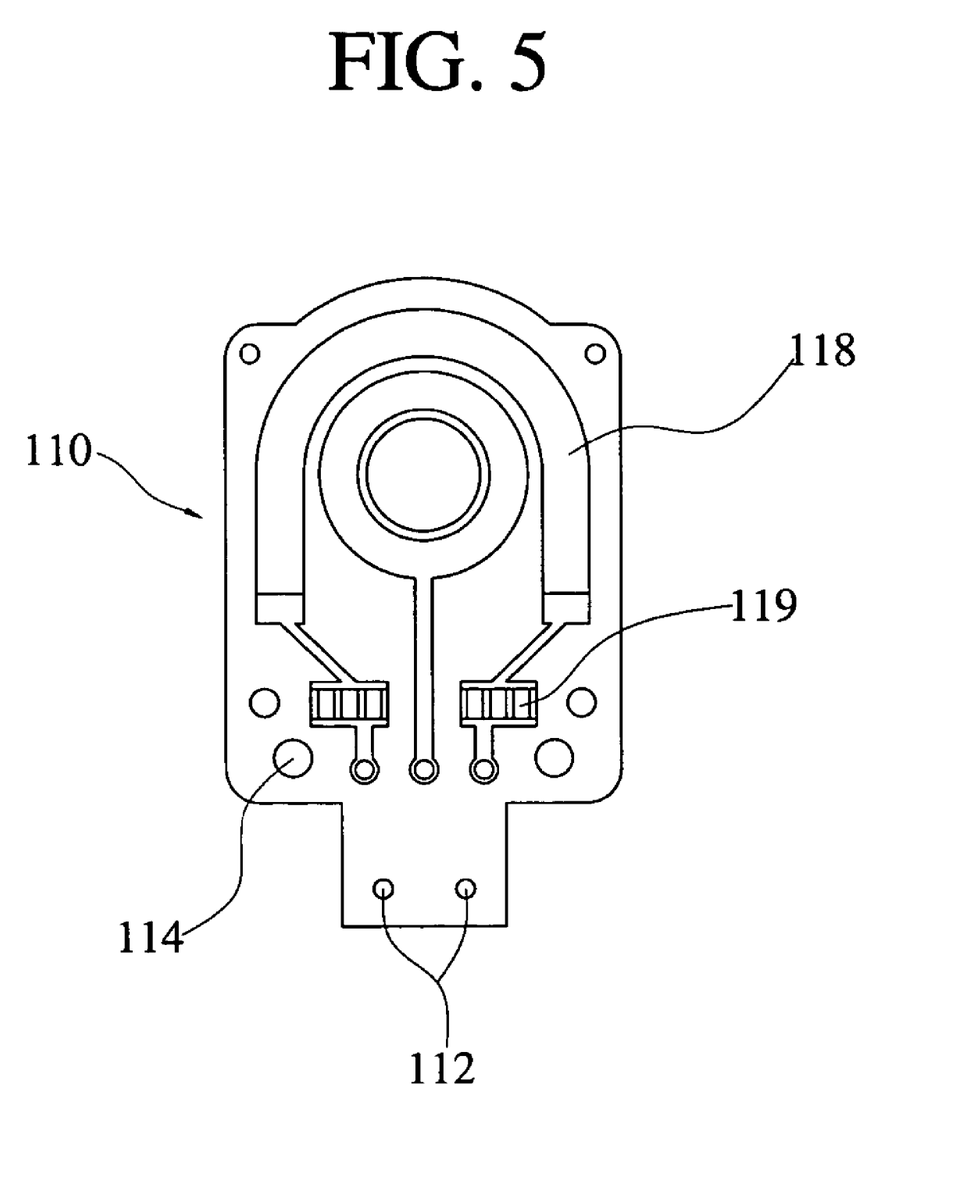
FIG. 5 is a plan view schematically showing a cover plate in the feedback apparatus for a vehicle air-conditioning actuator according to the present invention.

Several sectioned auxiliary resistors 119 are further formed in both ends of the thin plate resistor 118. Thus, when an error of the thin plate resistor 118 occurs, the auxiliary resistors 119 are made shorted, or removed or coupled in order to adjust a resistance value of the thin plate resistor 118.

That is, the feedback apparatus according to the present invention measures the total resistance value of the thin plate resistor 118 and the auxiliary resistors 119 which contact the wiper 140 before assembly. In the case that the resistance value is large, part of the auxiliary resistors 119 is separated in order to accurately adjust a resistance value, and then cover plate 110 is combined with the feedback apparatus 100. In doing so, since the total resistance value of the thin plate resistor 118 and the auxiliary resistors 119 is designed to be equal to or larger than a desired resistance value in most cases, the resistance value of only the thin plate resistor becomes a designed resistance value after fabrication. Thus, there is little post management.

A small case 120 is combined with the cover plate 110, including a second axial hole 122 corresponding to the first axial hole 116, a main wall 124 formed along the edge thereof, a predetermined space 126 formed in the inside thereof, and assembly protrusions 128 formed in one side thereof. Meanwhile, a slant surface 123 is formed around the lower circumference of the second axial hole 122.

A plate-shaped rotation slider 130 is interposed between the cover plate 110 and the small case 120, including a third axial hole 132 corresponding to the first and second axial holes 116 and 122, and an opening 131 whose size is about a quarter of the total size.

A groove 134 is formed in the upper portion of the axial hole 132 in the rotation slider 130, and is combined with the axis D1 of a spur gear. Six axial walls 135 are protruded around the opening 136 on the bottom of the rotation slider 130. A hook 137 is formed on three axial walls 135 among the six axial walls, respectively.

Thus, the opening 136 is formed and surrounded by the axial walls 135. The hook 137 is formed in every other axial wall 135. The hook 137 is elastically attached on and rotatably contacts the slant surface 123 in the small case 120. As a result, the rotation slider 130 is combined with the small case 120.

A wiper 140 whose contact front end 142 is exposed in the opening 131 of the rotation slider 130 and rear end 144 is fixed to the bottom of the rotation slider 130 to rotatably contact the thin plate resistor 118 on the bottom of the cover plate 110.

Protruding portions 133 are formed on the bottom of The rotation slider 130, in which assembly holes 146 of the wiper 140 are combined with the protruding portions 133 and after assembly the protruding portions 133 are melted and combined with the assembly holes 146.

Figure 3:
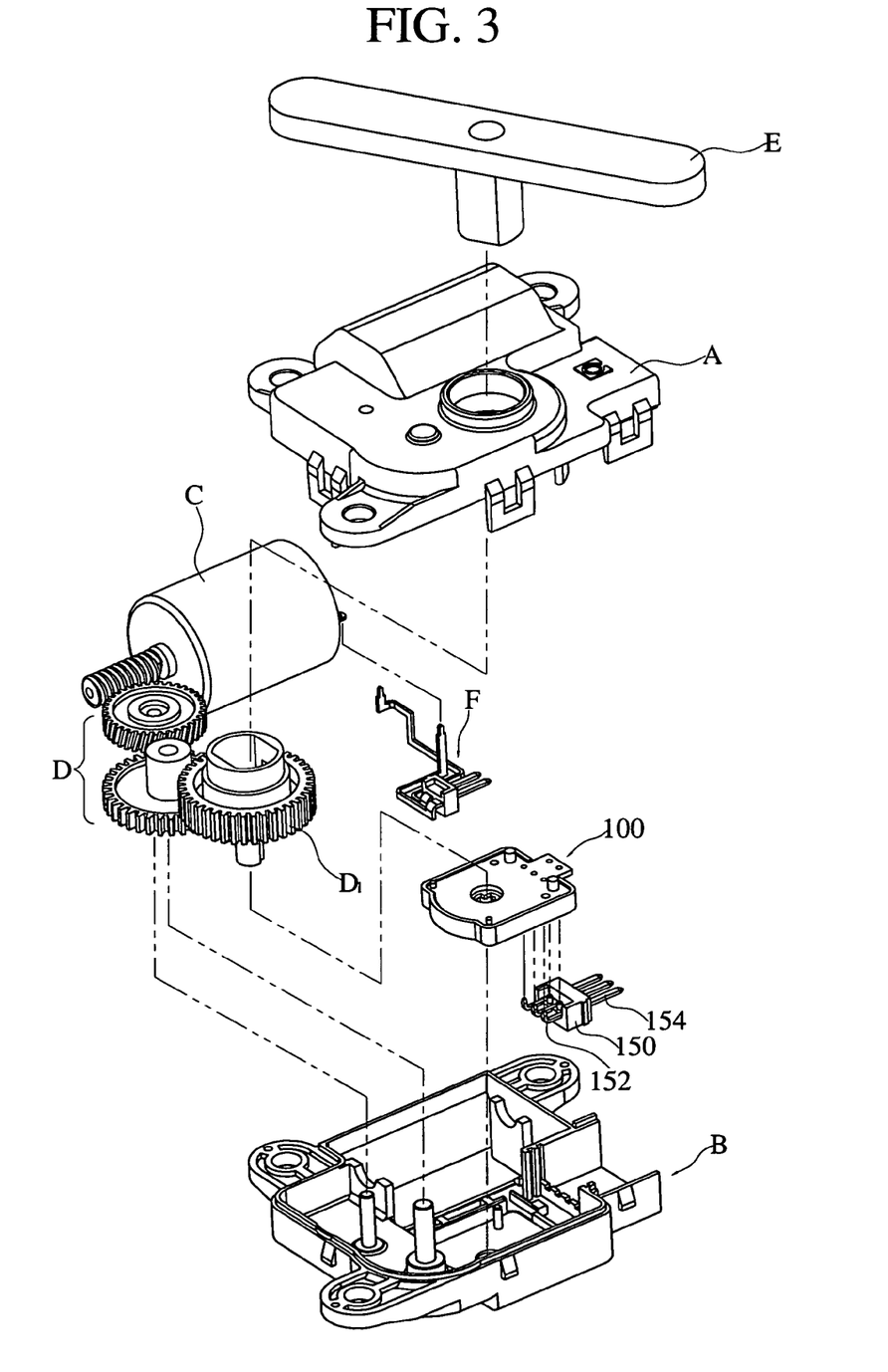
Figure 4A:
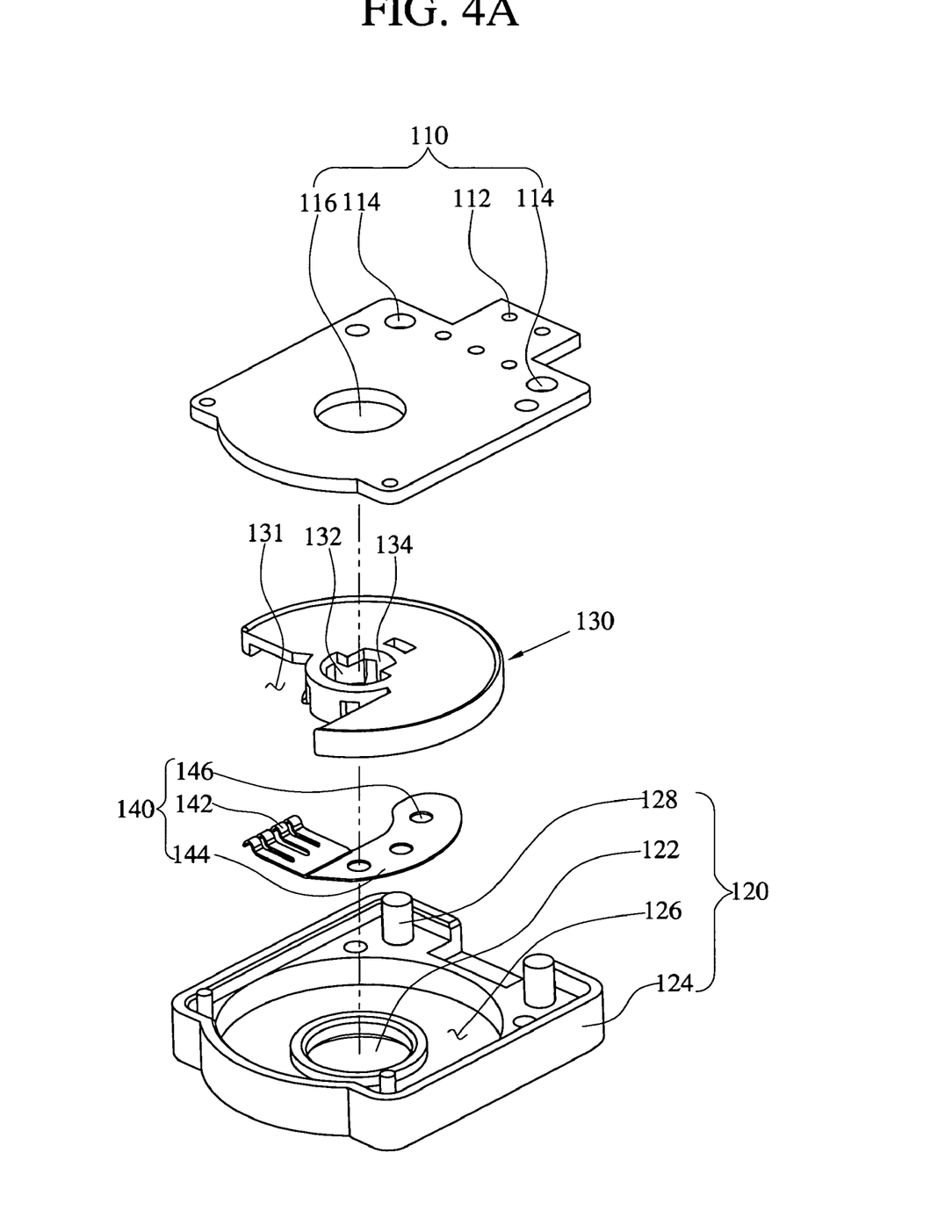
FIGS. 4A and 4B are an exploded perspective view showing a separated feedback apparatus for a vehicle air-conditioning actuator according to the present invention, viewed from the top and bottom, respectively.
Figure 4B:
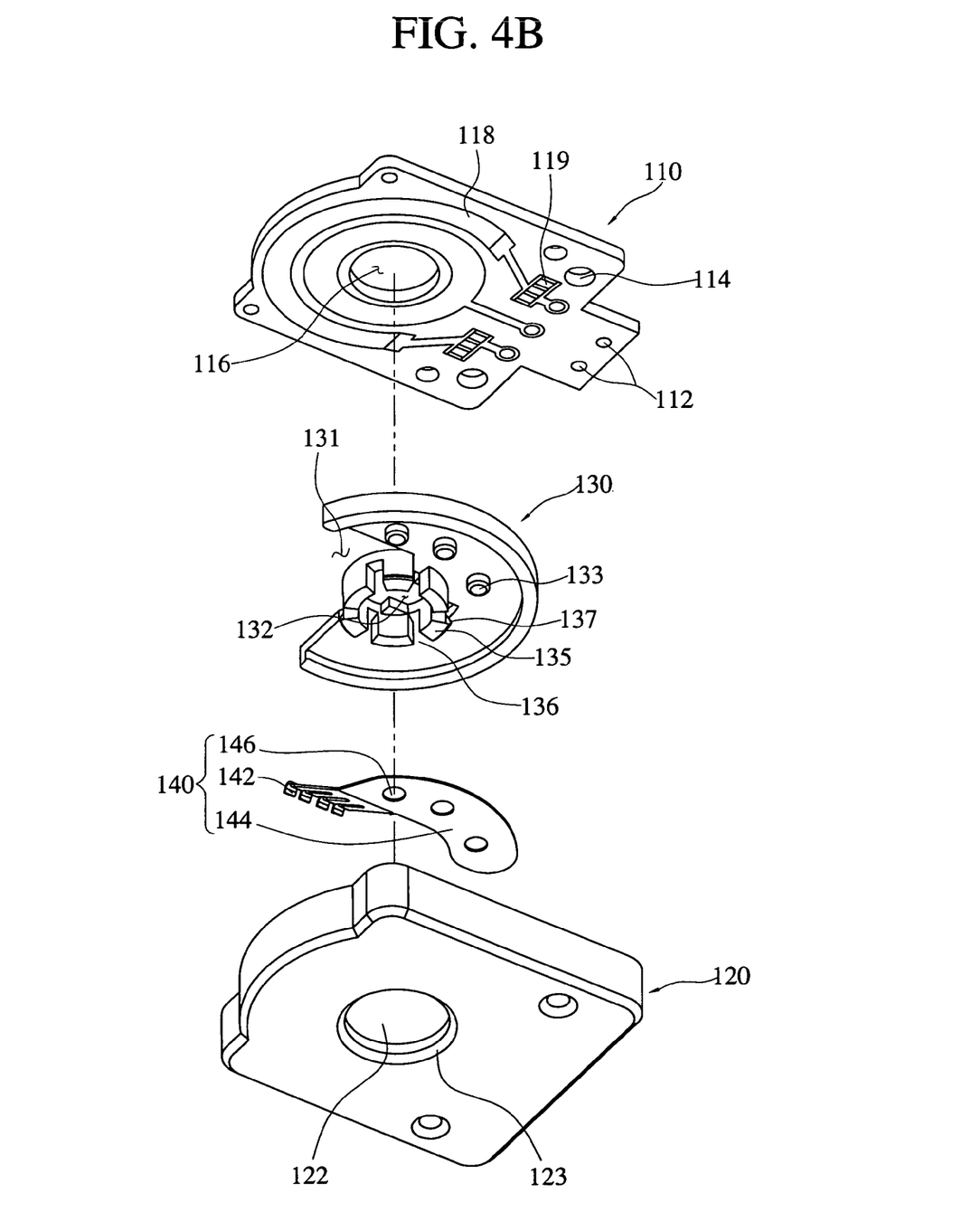

As shown in FIG. 3, a terminal assembly 150 is incorporated with the cover plate 110, in which connection pins 152 are connected with connection holes 112 on the cover plate 110 before assembly of the cover plate 110 and the small case 120. Connection pins 154 for receiving external signals are exposed in the front end of the terminal assembly 150.

An assembly and operation of the feedback apparatus for a vehicle air-conditioning actuator according to the present invention will be described below.

First, the protrusions 133 formed on the bottom of the rotation slider 130 are fitted into the assembly holes 146 on the wiper 140, and then the exposed terminals are combined so that the contact front end 142 of the wiper 140 is exposed into the opening 131 in the rotation slider 130.

The rotation slider 130 incorporated with the wiper 140 is combined with the small case 120 so that the axial walls 135 each having a hook 137 among the axial walls 135 extensively formed downwards from the third axial hole 132 is inserted into and elastically attached on the slant surface 123 on the bottom of the second axial hole 122 in the small case 120.

The cover plate 110 having a terminal assembly 150 formed on the bottom thereof is covered on the mounted rotation slider 130, so that the contact front end 142 in the wiper 140 contacts the thin plate resistor 118. Here, the assembly protrusions 128 protruded from the small case 120 are fitted on and combined with the assembly holes 114.

As described above, the completed feedback apparatus 100 according to the present invention is assembled as one component of the actuator. That is, the feedback apparatus is mounted and supported in the lower case B shown in FIG. 3. Then, the driving motor C, the group of gears D and the motor power source terminal F are assembled in the lower case B, and then the lower case B is covered with the upper case A.

The feedback apparatus for a vehicle air-conditioning actuator according to the present invention obtains a rotational action of the lever E axially combined with the final spur gear D1 through the gear group D, when the driving motor C is driven by a predetermined mode input signal.

Here, the lower axis of the sour gear D1 is connected with the rotation slider 130 in the feedback apparatus according to the present invention. The rotational trace of the rotation slider 130 is detected through the contact front end 142 of the wiper 140 contacting the thin plate resistor 118, and thus outputs a signal for indicating an angle of the rotational trace.

Figure 6:
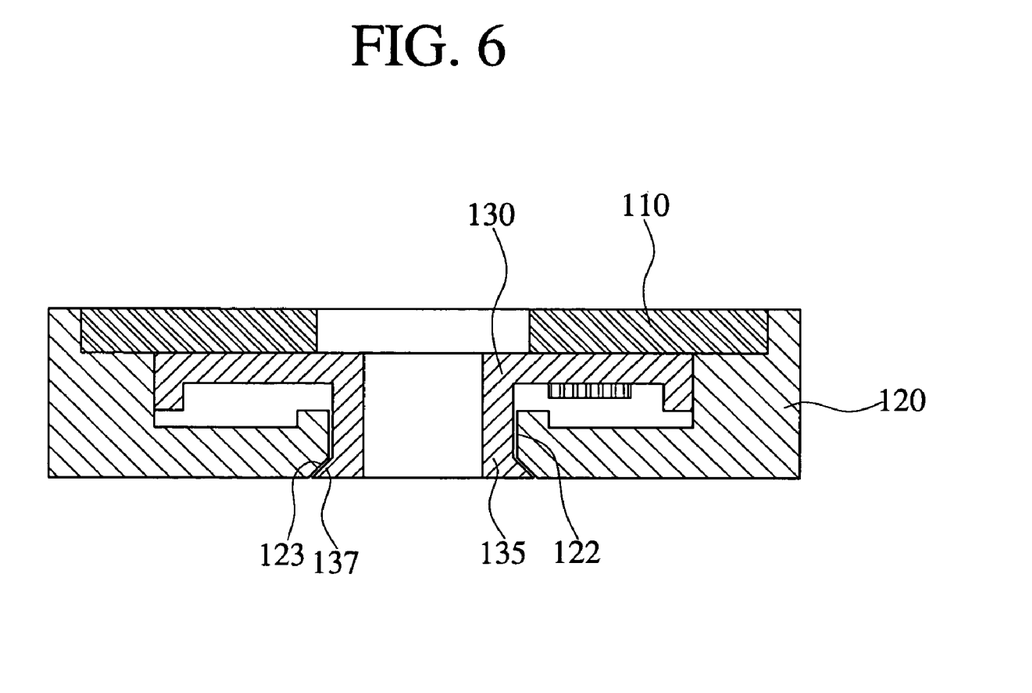
FIG. 6 is a cross-sectional view schematically showing a combined feedback apparatus for a vehicle air-conditioning actuator according to the present invention.

FIG. 6 is a cross-sectional view showing essential parts of the combined state of the rotation slider and the small case in the feedback apparatus for a vehicle air-conditioning actuator according to the present invention.

As shown in FIG. 6, the hook 137 in the rotation slider 130 passes the axial hole 122 in the small case 120 and rotatably elastically mounted on the slant surface 123 with the hook 137 in the rotation slider 130 fitted with the slant surface 123. Thus, whenever the rotation slider 130 rotates, the axial wall 135 having the hook 137 is fitted on the slant surface 123 formed on the lower portion of the axial hole 122 in the small case 120. As a result, the rotation slider 130 can smoothly rotate without any movement between the cover plate 110 and the small case 120.

As described above, the feedback apparatus for a vehicle air-conditioning actuator according to the present invention has the following advantages.

First, since the wiper and the thin plate resistor contact in a sealed case, there is little possibility of being seceded from an initial set position due to variation of the contact terminal upon external shock. Thus, an operational stability of the actuator is enhanced.

Second, the structure of the feedback apparatus according to the present invention is simplified in comparison with the conventional feedback apparatus having a feedback sensor assembly. As a result, an assembly work is simplified in addition to the operational stability. Also, the present invention provides the simplified structure and the advantageous unit price.

Third, the size of the feedback apparatus becomes small and thus the total assembly forming the actuator is simplified. Thus, the present invention can be advantageously applied to a vehicle air-conditioning actuator.

What is claimed is:

1. A feedback apparatus for a vehicle air-conditioning actuator, the feedback apparatus comprising:

a cover plate including terminal connection holes, assembly holes respectively formed in a predetermined position, a first axial hole formed in the center thereof, and a thin plate resistor formed on the bottom thereof;

a small case combined with the cover plate, including a second axial hole corresponding to the first axial hole, a main wall formed along the edge thereof, a predetermined space formed in the inside thereof, and an assembly protruding portion formed in one side thereof;

a plate-shaped rotation slider interposed between the cover plate and the small case, including a third axial hole corresponding to the first and second axial holes, and an opening whose size is about a quarter of the total size; and a wiper whose contact front end is exposed in the opening of the rotation slider and rear end is fixed to the bottom of the rotation slider to rotatably contact the bottom of the cover plate.

2. The feedback apparatus of claim 1, wherein the rotation slider comprises protruding portions formed on the bottom thereof in which the wiper combined with the protruding portions includes assembly holes and after assembly the protruding portions are melted and combined with the assembly holes.

3. The feedback apparatus of claim 1, wherein axial walls each having a hook formed on the bottom of the third axial hole in the rotation slider and a slant surface is formed downwards from the axial hole in the small case so that the hook 137 rotatably contacts the slant surface.

4. The feedback apparatus of claim 1, wherein auxiliary resistors are additionally provided for the thin plate resistor in the cover plate, in which part of the auxiliary resistors are removed to compensate for an insufficient resistance value in the case that a resistance value after fabrication of the cover plate differs from a designed resistance value.

* * * * *